Dec. 26, 1944.  M. J. BAYHI ET AL  2,365,930
APPARATUS FOR HANDLING SHELLS AND SIMILAR OBJECTS
Filed March 31, 1943  2 Sheets-Sheet 1
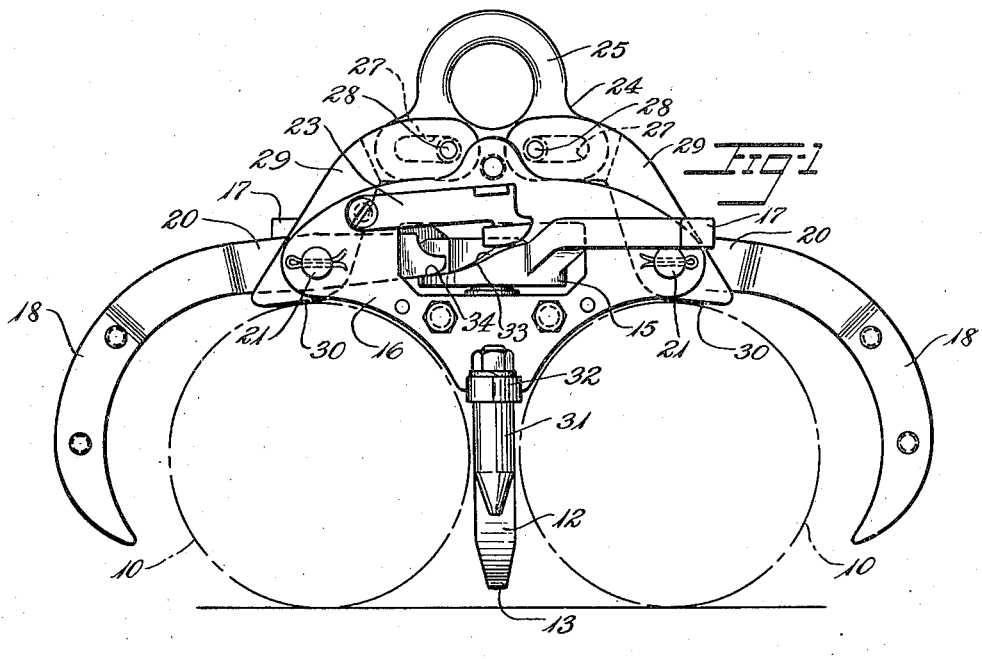
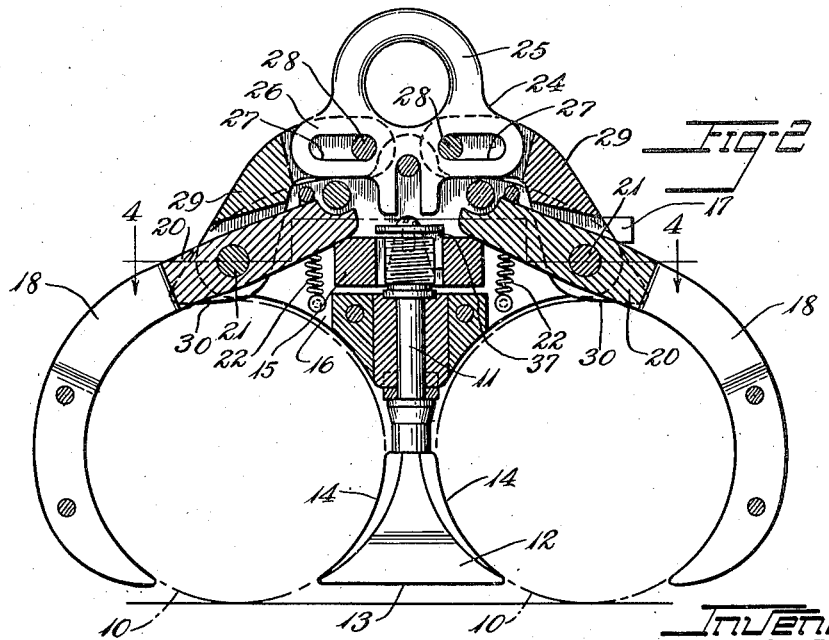
Inventors
Marcel J. Bayhi
Albert E. Lilja

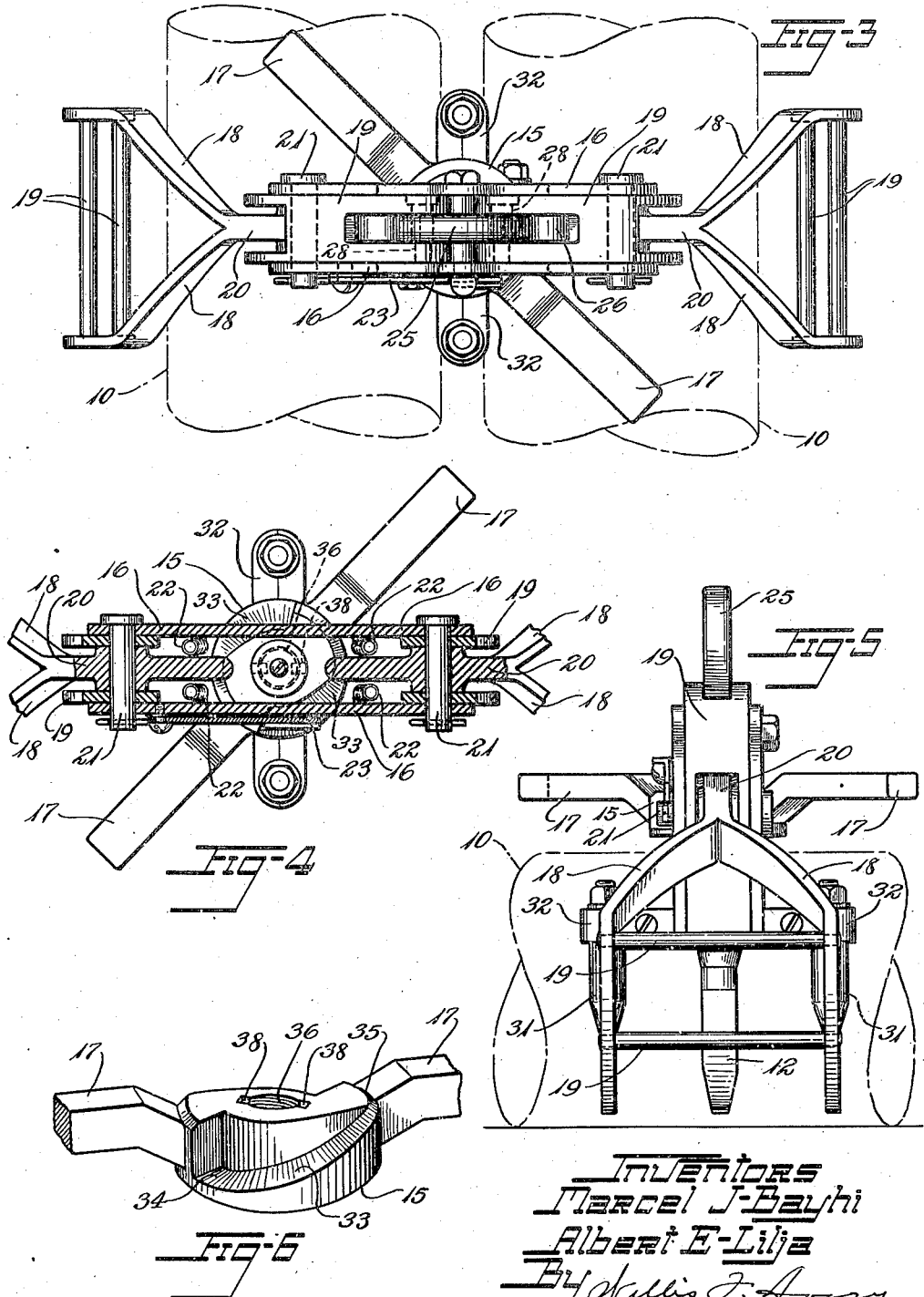

Patented Dec. 26, 1944

2,365,930

UNITED STATES PATENT OFFICE 2,365,930

APPARATUS FOR HANDLING SHELLS AND SIMILAR OBJECTS

Marcel J. Bayhi, Texarkana, Ark., and Albert E. Lilja, Texarkana, Tex., assignors to The B. F. Goodrich Company, New York, N. Y., a corporation of New York Application March 31, 1943, Serial No. 481,186

13 Claims. (Cl. 294—87)

This invention relates to an apparatus for holding objects in a firm grip preparatory to and while lifting and transporting the same from one place to another, and relates particularly to an apparatus for holding a pair of cylindrical objects, such as cannon shells and the like, preparatory to and while lifting and transporting the same.

One object of this invention is to provide an efficient, easily operable apparatus for holding objects, particularly heavy objects, in a firm grip so that they may be lifted and, if desired, transported. Another object is to provide an apparatus for holding heavy cylindrical objects such as cannon shells and the like in a firm grip. Still another object is to provide an apparatus with which two objects lying closely together may be gripped at the same time and in the same operation. One other object is to provide an apparatus with which two closely adjacent and substantially parallel cannon shells may be gripped and held at the same time and in the same operation so that they may be lifted, transported, or otherwise handled. Other objects of this invention will become apparent in the detailed description of the invention that is presented hereinafter.

We attain all these objects, and similar ones, by providing an apparatus having, in combination with other elements of the apparatus, rotatable holding means having at least one surface shaped to fit substantially a lower surface of the object to be lifted so as to at least partially support the object. We also provide means for rotating the rotatable holding means until the shaped surface fits the corresponding surface of the article to be lifted. Because this holding means is rotatable it is useful for handling two objects at once as it can be slipped in between two closely adjacent objects and then rotated into holding position with respect to both of them, thereby providing a means for grasping and holding both objects in the same operation. For convenience it is desirable that grasping means be provided for grasping the lower outside surfaces of each of the two objects so as to hold the objects in contact with the shaped surfaces of the rotatable holding means. These can conveniently be in the form of curved arms for engaging and grasping the outsides of the objects, such as cannon shells. It is desirable that means be provided for simultaneously rotating the rotatable holding means into position and moving the curved arms into grasping position around the outside of the shells. For additional safety in handling heavy objects there are also provided means actuated by handle means on the apparatus for immovably locking each shell in place.

This invention can best be understood by reference to the accompanying drawings, of which Fig. 1 is an elevation showing the apparatus of this invention being lowered over two shells and with all holding means in open position;

Fig. 2 is an elevation of the apparatus showing the holding means in closed position and with portions of the structure broken away for clarity of illustration;

Fig. 3 is a view looking down on the top of the apparatus with the holding means in open position;

Fig. 4 is a section taken along line 4—4 of Fig. 2;

Fig. 5 is an end view of the apparatus with the holding means in closed position; and Fig. 6 is a perspective of the cam of the apparatus with attached handle means for operating the cam.

In the accompanying drawings there is shown an embodiment of this invention for use in handling heavy cannon shells and the like. With this apparatus the heavy shells, indicated at 10, 10, are held in pairs in a firm grip so that they can be easily lifted and transported from one position or place to another. This apparatus includes a rotatable vertical shaft 11 progressing at its lower end into a flat plate 12 having a straight bottom 13 and two curved edge surfaces 14, 14 each shaped so as to contact and conform to a lower circumferential surface of a cannon shell 10, 10 and partially support it. The other end of the vertical shaft 11 is keyed to a cam 15 (Fig. 6) of circular shape placed in horizontal position within the framework 16 of the apparatus. This cam 15 is provided with two outwardly extending handles 17, 17 for turning the cam 15 and the attached rotatable shaft 11.

In this apparatus there are also provided bifurcated holding means comprising two pairs of curved arms 18, 18, and common arms 20, 20, with each pair of curved arms held in spaced-apart relationship by means of two rods 19, 19. These common arms 20, 20 are pivotally mounted on fulcrum pins 21, 21 within the framework 16 of the apparatus. These arms 18, 18 are so arranged that each pair grasps, or embraces circumferentially, the lower outside surface of a cannon shell 10 when all holding means are in closed position. Within the framework 16 and beyond the fulcrum pin 21 there are provided two coiled tension springs 22, 22 on each of the common arms 20, 20. These springs 22, 22 are located near the ends of the common arms 20, 20 with one end of each spring fastened to the framework 16 and the other end fastened to the arm 20. They serve to hold the end of the arm 20 against the sloped top surface 33 of the cam 15 and also tend to pull the arms 18, 18 into their open positions. The top surface 33 of the cam 15 is sloped so that when the cam 15 and the rotatable shaft 11 are turned by forcing the handle 17 on the cam 15 to the left the curved arms 18, 18 are forced into embracing position around the outside of the shells 10, 10 (as illustrated in Fig. 2). When the rotatable shaft 11, with its rotatable plate 12, and the curved arms 18, 18 have reached holding position a safety catch 23, which ordinarily rides on top of the cam surface 33, drops into the deep portion 34 (Fig. 6) of the sloped surface 33 and prevents the cam 15 from turning back and releasing the curved arms 18, 18. This safety catch 23 is pivotally mounted on the framework 16.

In order to have means for lifting the shells 10, 10, there is provided near the top of the apparatus a clevis 24 comprising a ring 25 that progresses into a plate 26. This clevis plate 26 has two horizontal slots 27, 27, one on each side of the ring 25, and in each slot rides a pin 28, 28 attached to a toggle arm 29. This toggle arm 29 is curved and has a fork-like structure at each end, the fork-like structure at one end embracing the slot 27 in the clevis plate 26 and holding the aforementioned pin 28, and the fork-like structure at the other end embracing the common arm 20 of the bifurcated holding means. The toggle arm is pivotally mounted on the fulcrum pin 21 that passes through the common arm 20. This toggle arm arrangement is provided so that when the shells are lifted by means of the clevis ring 25 each toggle arm pin 28 rides upward and outward so that the bearing surface 30 of the toggle arm pivoted on the fulcrum 21 bears down on the shell 10 and holds it firmly clamped into place. Thus it can be seen that each shell is held firmly at three main points: the inner surfaces of the curved arms 18, 18, the curved edge surface 14 of the plate 12, and the bearing surface 30 of the toggle arm 29.

In order to maintain the two shells in perfect parallel alignment while they are being lifted there are provided two spacer posts 31, 31 mounted on a supporting bar 32 in line with the rotatable shaft 11 and at right angles to the main body of the apparatus. These spacer posts 31, 31 are arranged so as to pass down between the shells 10, 10 and hold them in parallel alignment when the apparatus is lowered over each pair of shells.

In utilizing the apparatus of this invention for lifting two cannon shells 10, 10 arranged adjacent and substantially parallel to each other, the cam handle 17 is preliminarily turned to the right as far as it will go (Fig. 1). This opens the curved arms 18, 18 and arranges the plate 12 on the rotatable shaft 11 so that it is at a right angle to main body of the apparatus. Then when the apparatus is lowered over the two shells 10, 10 the arms 18, 18 are ready to grasp the outside surfaces of the shells and the rotatable plate 12 is ready to pass between the shells. The apparatus is lowered onto the shells and the two spacer posts 31, 31 and the rotatable plate 12 slide between the shells. When the apparatus rests on the top of the two shells 10, 10 the cam handle 17 is turned to the left as far as it will go and until the safety catch 23 slips into place. This turns the cam 15 and also turns the rotatable plate 12 at a right angle to the shells. The sloped surface 33 of the cam, at the same time, forces the curved arms 18, 18 tightly around the shells 10, 10. The apparatus with the held shells is then lifted by means of the clevis ring 25 and this causes the toggle pins 28, 28 to ride upward and outward in the clevis plate slots 27, 27, thereby pivoting the toggle arms 29, 29 around the fulcrum 21, 21 so that the bearing surfaces 30, 30 of the toggle arms 29, 29 press down on the shells 10, 10 and lock them securely in position. The cannon shells can then be moved, lifted, and transported safely as they are tightly clasped in the apparatus, and the heavier the shells the more tightly they are clasped.

After the shells have been transported to their destination they can be released by raising the safety catch 23 and turning the cam handle 17 back to the right. This opens the curved arms 18, 18 and turns the rotatable plate 12 back parallel to the longitudinal axis of the shells.

The apparatus here described is so constructed that it may be used for handling one cannon shell, or other object, as well as two. This is true because each side of the apparatus acts independently of the other; each side has its curved arms 18, 18, its toggle arm 29, its bearing surface of the rotatable plate 12, and so on.

The cam 15 of this apparatus (Fig. 6) is divided into two surfaces 33, 33, each bearing on the arm 20 of the bifurcated holding means. Each surface has a deep portion 34 with a substantially horizontal surface. As this surface progresses around a half circumference of the cam up to the top 35 of the cam the angle of the surface increases and, at the same time, the surface becomes narrower. In the cam illustrated the surfaces go from an angle of zero degrees to about 19.3° at the top 35 of the cam and varies in width from about 0.656 inch to about 0.257 inch. The cam illustrated has a diameter of about 3 inches.

In the particular embodiment of the invention illustrated in the drawings, suitable arrangements are provided for taking care of the wear on the cam surface. The cam 15 is provided with a threaded center 36 extending through the cam. The rotatable vertical shaft 11 is also provided with a corresponding thread so that the cam 15 can be screwed on the post. There is also provided a removable key 37 to fit in a slot 38 in the cam and in a corresponding slot in the rotatable post. When the cam wears away a sufficient amount the key 37 is removed, the cam 15 unscrewed enough to take care of the wear on the cam 15, and the key 37 is replaced, thereby adjusting the cam arrangement to take care of the wear.

The apparatus of this invention as illustrated by a preferred embodiment has been described in considerable detail to show how it would be constructed and how it would operate for handling cannon shells and the like. It is apparent that only minor changes would be required to make an apparatus capable of handling any other objects desired in the same manner. These changes would apply only to minor details in the structure and would in no manner affect the inventive concept involved. For these reasons it is desired to claim the invention broadly within the spirit and scope of the appended claims.

We claim:

1. In an apparatus for holding generally cylindrical objects such as cannon shells in a firm grip preparatory to lifting and transporting the same from one location to another, apparatus including rotatable holding means for insertion between two adjacent and substantially parallel objects and having surfaces shaped to fit substantially a lower surface of each object so as to support said objects only partially, means for rotating the rotatable holding means until said shaped surfaces fit the corresponding surfaces of the two objects, and movable means for holding said objects against the shaped surfaces of the rotatable holding means.

2. In an apparatus for holding generally cylindrical objects such as cannon shells in a firm grip preparatory to lifting and transporting the same from one location to another, apparatus including rotatable holding means for insertion between two adjacent and substantially parallel objects and having surfaces shaped to fit substantially a lower surface of each object so as to at least partially support said objects, grasping means for grasping the lower outside surfaces of said objects, means for rotating said rotatable holding means until said shaped surfaces fit the corresponding surfaces of the two objects, and means for moving said grasping means in grasping position around the lower outside surface of said objects.

3. In an apparatus for holding generally cylindrical objects such as cannon shells in a firm grip preparatory to lifting and transporting the same from one location to another, apparatus including rotatable holding means for insertion between two adjacent and substantially parallel objects and having surfaces shaped to fit substantially a lower surface of each object so as to at least partially support said objects, grasping means for grasping the lower outside surfaces of said objects, and means for simultaneously rotating said rotatable holding means until said shaped surfaces fit the corresponding surfaces of the two objects and moving said grasping means into grasping position around the lower outside surfaces of said objects.

4. In an apparatus for holding generally cylindrical objects such as cannon shells in a firm grip preparatory to lifting and transporting the same from one location to another, apparatus including rotatable holding means for insertion between two adjacent and substantially parallel objects and having surfaces shaped to fit substantially a lower surface of each object so as to at least partially support said objects, grasping means for grasping the lower outside surfaces of said objects, means for simultaneously rotating said rotatable holding means until said shaped surfaces fit the corresponding surfaces of the two objects and moving said grasping means in grasping position around the lower outside surfaces of said objects, handle means for lifting the apparatus, and means actuated by said handle means for locking each object in place.

5. In an apparatus for holding generally cylindrical objects such as cannon shells in a firm grip preparatory to lifting and transporting the same from one location to another, apparatus including rotatable holding means for insertion between two adjacent and substantially parallel objects and comprising a substantially vertical shaft with an attached blade broad at the bottom and with curved edges so constructed and arranged as to fit substantially a lower surface of each object to at least partially support said objects, grasping means comprising curved arms for grasping the outside surfaces of said objects, and means for simultaneously rotating said rotatable holding means until said curved edges fit the corresponding surfaces of the two objects and moving said curved arms into grasping position around the lower outside surfaces of said objects.

6. In an apparatus for holding generally cylindrical objects such as cannon shells in a firm grip preparatory to lifting and transporting the same from one location to another, apparatus including rotatable holding means for insertion between two adjacent and substantially parallel objects and comprising a substantially vertical shaft with an attached blade flat at the bottom and with curved edges so constructed and arranged as to fit substantially a lower surface of each object to at least partially support said objects, grasping means comprising curved arms for grasping the lower outside surfaces of said objects, means for simultaneously rotating said rotatable holding means until said curved edges fit the corresponding surfaces of the two objects and moving said curved arms into grasping position around the lower outside surfaces of said objects, handle means for lifting the apparatus, and means actuated by said handle means for locking each object in place.

7. In an apparatus for holding generally cylindrical objects such as cannon shells in a firm grip preparatory to lifting and transporting the same from one location to another, apparatus including rotatable holding means for insertion between two adjacent and substantially parallel objects and comprising a substantially vertical shaft with an attached blade flat at the bottom and with curved edges so constructed and arranged as to fit substantially a lower surface of each object to at least partially support said objects, grasping means comprising curved arms for grasping the lower outside surfaces of said objects, means for rotating said shaft until said curved edges of said blade fit the corresponding surfaces of the two objects, means including a cam rotatable with said shaft for moving said curved arms into grasping position around the lower outside surfaces of said objects, handle means for lifting the apparatus and means actuated by said handle means for locking each object in position between a curved blade surface and a curved arm.

8. In an apparatus for holding generally cylindrical objects such as cannon shells in a firm grip preparatory to lifting and transporting the same from one location to another, apparatus including rotatable holding means for insertion between two adjacent and substantially parallel objects and comprising a substantially vertical shaft with an attached blade flat at the bottom and with curved edges so constructed and arranged as to fit substantially a lower surface of each object to at least partially support said objects, grasping means comprising curved arms for grasping the lower outside surfaces of said objects, means for rotating said shaft until said curved edges of the said blade fit the corresponding surfaces of the two objects, means including a cam rotatable with said shaft for moving said curved arms into grasping position around the lower outside surfaces of said objects, handle means for lifting the apparatus, and means comprising pivoted toggle arms actuated by said handle means for locking the objects between the curved blade surfaces, the curved arms, and the bearing surface of the toggle arms.

9. Apparatus for holding a plurality of objects of the general character described, said apparatus comprising, in combination, three object-supporting members adapted cooperatively to hold two adjacent objects, two of said object-supporting members being mounted for movement into and out of holding engagement respectively with generally opposed outer portions of the two objects, the third object-supporting member being adapted to extend between the two objects to engage adjacent portions of both objects and also being movable into and out of supporting engagement with said objects.

10. Apparatus for holding a plurality of objects of the general character described, said apparatus comprising, in combination, three object-supporting members adapted cooperatively to hold two adjacent objects, two of said object-supporting members being mounted for movement into and out of holding engagement respectively with generally opposed outer portions of the two objects, the third object-supporting member being adapted to extend between the two objects to engage adjacent portions of both objects and also being movable into and out of supporting engagement with said objects, and a single means for moving all three supporting members into supporting engagement with the said objects.

11. Apparatus for holding a plurality of objects of the general character described, said apparatus comprising, in combination, three object-supporting members adapted cooperatively to hold two adjacent objects, two of said members comprising grasping arms movable inwardly and outwardly into and out of grasping engagement respectively with generally opposed outer portions of the two objects, the third member being adapted to be inserted between the said two objects and to engage adjacent portions of both to assist in supporting both said objects, the said third member being rotatable about an axis extending between the objects for moving object-engaging portions thereof into and out of engagement with the said two objects.

12. Apparatus of the character described comprising two object-supporting elements adapted cooperatively to support an object therebetween, one of said elements being rotatable about a generally vertical axis to move a portion thereof into and out of object-supporting position, the other of said elements being swingable toward and away from said axis to move the second element into and out of its cooperative object-supporting position, and means for so moving said elements.

13. Apparatus of the character described comprising two object-supporting elements adapted cooperatively to support an object therebetween, one of said elements being rotatable about a generally vertical axis to move a portion thereof into and out of object-supporting position, the other of said elements being swingable toward and away from said axis to move the second element into and out of its cooperative object-supporting position, and means comprising a single operator-controlled element for so moving both said elements into and out of their respective object-supporting positions.

MARCEL J. BAYHI.
ALBERT E. LILJA.